(12) United States Patent  (10) Patent No.: US 9,126,760 B2
Bianchini  (45) Date of Patent: Sep. 8, 2015

(54) INSTALLATION FOR CONVEYING ITEMS CONSISTING OF A THERMOPLASTIC MATERIAL

(75) Inventor: Cedric Bianchini, Octeville-sur-Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 0 days.

(21) Appl. No.: 13/580,842

(22) PCT Filed: Feb. 24, 2011

(86) PCT No.: PCT/FR2011/050388
§ 371 (c)(1),
(2), (4) Date: Aug. 23, 2012

(87) PCT Pub. No.: WO2011/104484
PCT Pub. Date: Sep. 1, 2011

(65) Prior Publication Data
US 2012/0312661 A1  Dec. 13, 2012

(30) Foreign Application Priority Data

Feb. 25, 2010  (FR) ...................................... 10 51342

(51) Int. Cl.
*B65G 15/10* (2006.01)
*B65G 15/14* (2006.01)

(52) U.S. Cl.
CPC .............. *B65G 15/14* (2013.01); *B65G 15/105* (2013.01)

(58) Field of Classification Search
CPC ....... B65G 15/10; B65G 15/14; B65G 37/005

USPC ........... 198/440, 441, 626.1, 817, 844.2, 846, 198/957
See application file for complete search history.

(56) References Cited

U.S. PATENT DOCUMENTS

| 2,713,412 | A | | 7/1955 | Douglass |
|---|---|---|---|---|
| 3,297,514 | A | | 1/1967 | Poeschl et al. |
| 4,147,251 | A | | 4/1979 | Focke |
| 4,311,756 | A | | 1/1982 | Brooksbank |
| 4,802,571 | A | * | 2/1989 | Born et al. ................ 198/626.1 |
| 5,123,318 | A | * | 6/1992 | Su et al. ......................... 83/289 |
| 6,109,426 | A | * | 8/2000 | Messer, III ................... 198/817 |
| 6,131,724 | A | * | 10/2000 | Hirasawatu et al. .......... 198/681 |
| 6,382,399 | B2 | * | 5/2002 | Simkowski ................ 198/626.1 |
| 7,861,852 | B2 | * | 1/2011 | Klaiber et al. ............. 198/626.1 |
| 7,866,458 | B2 | | 1/2011 | Charpentier |
| 8,033,387 | B2 | * | 10/2011 | Wang ............................ 198/847 |
| 8,151,970 | B2 | * | 4/2012 | McDonald et al. ........... 198/389 |
| 8,418,839 | B2 | * | 4/2013 | Anderson ..................... 198/790 |
| 2002/0170806 | A1 | | 11/2002 | Engle et al. |

FOREIGN PATENT DOCUMENTS

| DE | 26 23 069 A1 | 12/1977 |
|---|---|---|
| DE | 10 2005 056374 A1 | 5/2007 |
| DE | 10 2006 038320 A1 | 2/2008 |
| EP | 1 559 663 A1 | 8/2005 |

(Continued)

*Primary Examiner* — Douglas Hess
(74) *Attorney, Agent, or Firm* — Sughrue Mion, PLLC

(57) ABSTRACT

The installation includes a conveyor system having at least one conveyor provided with two conveyor bodies having active strands that are parallel to each other for receiving and transporting articles that are arranged successively between the active strands. One of the conveyor bodies has a natural leather material, at least on the active part thereof in direct contact with the items. The conveyor bodies have belts that are at least partially or fully formed using leather.

17 Claims, 3 Drawing Sheets

(56) References Cited

FOREIGN PATENT DOCUMENTS

| | | |
|---|---|---|
| EP | 1 669 635 A1 | 6/2006 |
| FR | 1 099 528 A | 9/1955 |
| FR | 2 882 736 A1 | 9/2006 |
| LU | 45 002 A1 | 2/1964 |
| WO | 02/084145 A1 | 10/2002 |

\* cited by examiner

INSTALLATION FOR CONVEYING ITEMS CONSISTING OF A THERMOPLASTIC MATERIAL

CROSS REFERENCE TO RELATED APPLICATIONS

This application is a National Stage of International Application No. PCT/FR2011/050388 filed Feb. 24, 2011, claiming priority based on French Patent Application No. 1051342 filed Feb. 25, 2010, the contents of all of which are incorporated herein by reference in their entirety.

FIELD OF INVENTION

The invention relates to installations for conveying items or articles consisting of a thermoplastic material, such as bottle preforms. It more particularly relates to the conveyor member itself, meaning a member such as an endless conveyor belt which is in direct contact with the articles.

BACKGROUND OF INVENTION

The conveying system described in document EP 1559663, dated 2004, explicitly relates to the transport of bottle preforms. This system aims at organizing the flow of the preforms from a random stream into an ordered stream, in order to feed them to a star wheel receiving unit which loads a station where these preforms are heated before they are blown and converted into bottles by an appropriate machine.

Filling the star wheel requires the accumulation of preforms upstream from this wheel, and this accumulation of preforms causes friction between the conveyor members and the preforms which are in single file and touching each other between said conveyor members.

In this document EP 1559663, which is closely related to the object of the invention, the conveyor members are described as consisting of belts in the form of cords having a cylindrical cross-section, made of a material such as natural or synthetic rubber; they may also consist of a metal chain with a covering.

It is also specified in this document EP 1559663 that the friction coefficient is proportioned so that the preforms are advanced by the friction force which can exist, because of adhesion, between said preforms and the conveyor members, said preforms sliding about in the accumulation area until the accumulation pressure required to engage the preforms in the star wheel receiving unit is reached.

One of the means described in that document for adjusting the friction coefficient consists of using a covering which is temporarily applied to the neck of the preforms.

The problem lies in the preforms, which vary in their adhesion to the conveyor members. This adhesion is related to numerous parameters such as the type of material constituting the preforms, or the temperature and the level of humidity where the preforms are being processed. The same is true to a lesser extent for the conveyor members.

The variability of preform adhesion to the conveyor members causes a change in the contact relationship and in the coefficient of friction between the preforms and said conveyor members in the accumulation area, influencing the pressure at which the preforms engage with the receiving unit.

As soon as there is pressure between the preforms and friction between these preforms and the conveyor members, the contact relationship evolves; an increase in temperature in the area of friction is indeed observed and the materials present deteriorate at an ever-increasing rate.

Also, in the preform accumulation area where said preforms and said conveyor members are in sliding contact, the friction between the preforms and the conveyor members, in particular, may lead to damage of the preforms and/or conveyor members caused by abrasion. Such a phenomenon can impact the shaping of the preforms during the blowing operation if they have been damaged, and/or reduce the service life of the conveyor members.

Lastly, the sliding contact between the preforms and the conveyor members in the accumulation area may, depending on the type of conveyor members used, generate significant noise.

A continual increase in production rates, now exceeding 50,000 bottles processed per hour, and the friction/adhesion between the preforms and the conveyor members, are a source of numerous problems in current installations.

The friction coefficient between the preforms and the conveyor members is influenced by the material of the preforms, which affects the adhesion, and by the covering and structure of the surface of the conveyor members.

It is becoming more and more difficult to manage the consequences of friction phenomena due to variations in the adhesion of the preforms to the conveyor members.

SUMMARY OF INVENTION

To remedy these problems, which are related to the contact relationship between the preforms and the conveyor members, the invention proposes establishing a contact relationship which does not depend on the nature of the preforms nor on their potential for changing over time and, in particular, during their conveyance and/or accumulation.

Aside from document EP 1559663 cited above, no other document reports this particular problem, or proposes or suggests a solution that can be applied without demonstrating inventive activity.

In the invention, the contact relationship is in fact entirely managed by the conveyor members and in particular by the portion of these conveyor members which is in direct contact with the preforms. This occurs in a conveying installation comprising a simple conveyor or a conveyor system consisting of several conveyors of which at least one is a conveyor-accumulator, i.e. a conveyor where a lasting friction relationship is established between the preforms and the conveyor members.

The invention allows controlling this friction relationship between preforms and conveyor members in order to obtain and maintain a substantially constant pressure from these preforms at the entry to the receiving unit which is downstream from the conveyor-accumulator, and does so regardless of the operating conditions influencing the adhesion of the preforms.

The conveying installation of the invention concerns the transport of articles of a thermoplastic material such as bottle preforms; it comprises a conveyor system which comprises at least one conveyor equipped with two conveyor members (also referred to as conveyor bodies) having active sides (also referred to as active strands) that are parallel to each other for receiving and transporting said articles which are arranged in single file between said active sides, each conveyor member has an active portion which is in direct contact with said articles and at least one of said conveyor members comprises, at least on its active portion, a surface consisting of a natural material: leather.

The contact relationship between the leather and the preform articles is perfectly controllable in that it solves all the problems encountered up to the present time, such as problems related to wear in the guide components, noise problems, etc.

In fact, by using leather in the conveyor members, the variations in preform adhesion according to the different operating conditions are "absorbed", thus maintaining a constant feed pressure in the accumulation area for the receiving unit.

The use of endless conveyor members consisting of leather belts is described in document U.S. Pat. No. 2,713,412 from the year 1951. This document addresses the problem of high speed conveyance of trays of food between a kitchen and receiving stations, and describes a conveyor system formed of two endless conveyor members made of leather on which the trays to be conveyed are resting.

Another document, patent FR 1099528 from the year 1954, relates to a transmission element intended to replace these conventional leather belts, and proposes a belt having a hybrid structure formed of a core consisting of an endless band of steel, or some other elastic material, covered by a flexible material such as rubber or plastic. That document therefore suggests abandoning leather in favor of more high tech materials.

Such endless transmission elements have since tended to evolve into increasingly complex designs, particularly in terms of structure and/or component materials, accompanied by the development and use of the properties of synthetic materials.

None of these cited documents discuss the specific problems existing in the context of the conveyance and/or accumulation of thermoplastic articles such as bottle preforms, and the combined problems related to the friction and adhesion of preforms to their conveyor members. Indeed, as these preform elements appeared during the 1970s (1976), the specific problems related to their conveyance could not have been addressed before that time; thus at that point the teachings provided by the above prior art documents lie in particular in abandoning transmission elements of natural materials and in using elements having an increasingly complex and more high tech structure and/or materials. This trend towards substituting synthetic materials for natural materials is even more pronounced when these transmission elements are intended to be used in aseptic environments such as those where bottle preforms are processed.

In the present application, leather also has the advantage of being antistatic and, hence, does not carry dust. It is also very resistant to abrasion and has good tensile strength, and does no harm to the preform, i.e. it does not damage it.

In addition, the leather used in the present document is a vegetable leather type, prepared by a tanning process which does not use chrome but natural products such as chestnut bark, and its impregnation uses animal oils. This process guarantees a complete absence of toxicity in these leather belts, as they may be used in the food industry and can also meet the conditions imposed on products intended for young children.

According to the invention, the conveyor members consist of continuous belts which comprise leather.

In a first embodiment of the invention, the belts are integrally made of leather.

In a variant embodiment of the invention, the belts are a combination, or composite, meaning they comprise a portion consisting of a conventional transmission belt, notched, for example with self-centering herringbone or curvilinear teeth, and a portion consisting of a leather covering for the contact with the transported articles.

Still according to the invention, the belts may be flat or may have a substantially circular cross-section; in the case of a circular belt, the diameter is about 9 mm for example.

In another arrangement of the invention, the leather belts having a circular cross-section comprise a joining of their ends which may be in the form of at least one staple buried in the leather, or a longitudinal V or scarf joint, said joint being assembled by gluing, or by sewing, or by gluing with sewing as reinforcement.

Still according to the invention, the combination or composite type belts may comprise, on the back of the portion which performs the transmission, a peripheral projecting rib, said rib having a groove arranged to accept a belt integrally made of leather.

In the case of a conveyor member consisting of a pair of endless belts, each belt being a composite type belt having a portion made of a plastic such as food grade polyurethane and a portion made of leather, the two can be assembled by polymerization after the leather is impregnated with polyurethane on the flesh side, the grain side being intended for contact with the preforms.

The invention also relates in general to the use of leather as a contact material between the conveyor member and the transported article, whether the conveyor member is in the form of a belt integrally made of leather or is in the form of a combination, or composite type, belt comprising a portion consisting of a conventional transmission belt, notched, for example with self-centering herringbone or curvilinear teeth, and a portion solidly attached to the back of said transmission belt, consisting of a leather covering in the form of a strip or in some other form.

The invention therefore relates to the use of leather as the contact material between the conveyor member and the transported article, for at least one of the conveyor members in an installation for conveying articles such as bottle preforms between a feed device, such as a star wheel, which is for example associated with a conditioning station for said articles which has a constant throughput when operating at normal speed, and an extraction device which is associated with a station for storing said articles and for which the more random throughput can be adjusted to satisfy the demand of the conditioning station, said installation comprising a conveyor system with at least one conveyor and in particular a conveyor-accumulator.

The use of conveyor members having a portion made of leather allows the feed device and said conveyor members to be slightly out of sync without this phenomenon adversely affecting preform gripping and conveyance in the desired position.

BRIEF DESCRIPTION OF DRAWINGS

To facilitate the use of the invention, it is illustrated in a sufficiently clear and complete manner in the following description, accompanied by drawings in which.

DETAILED DESCRIPTION OF DRAWINGS

Figure 1:
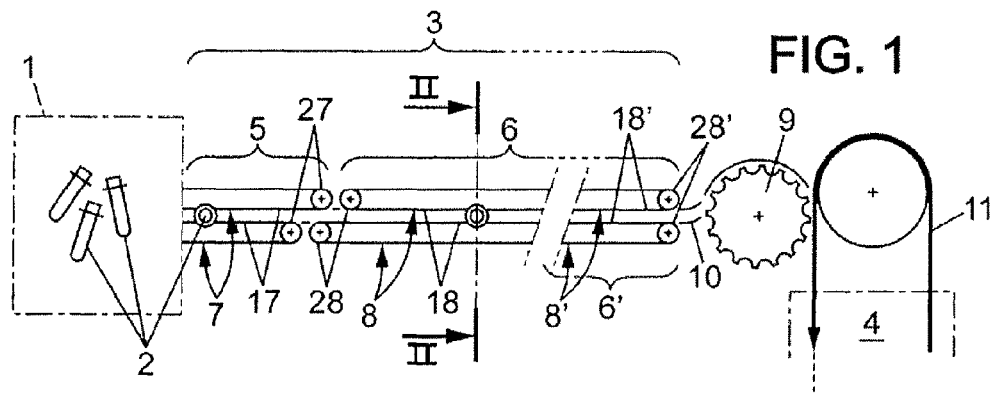
FIG. 1 schematically represents a conveying installation of the invention, for the case of preforms conveyed in a vertical position and carried by conveyor members which grasp them under their neck.
Figure 3:
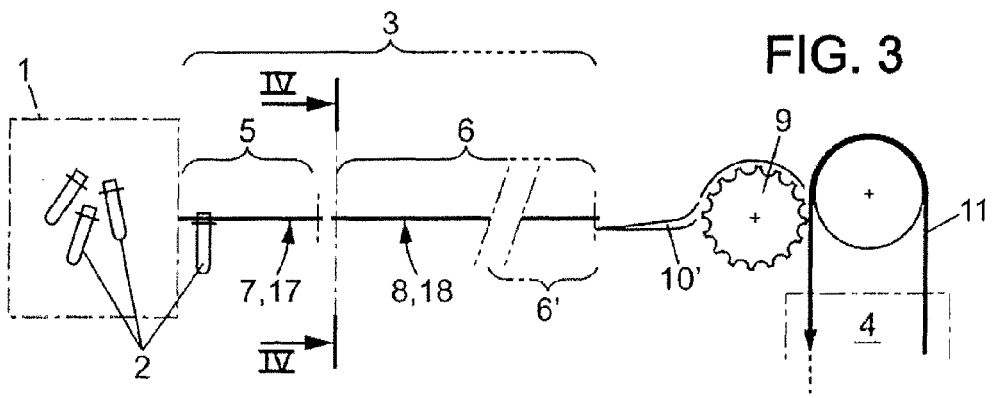
FIG. 3 schematically represents a conveying installation of the invention, for the case of preforms conveyed horizontally and held between conveyor members which are in contact with the neck of these preforms.

The installation diagrammed in FIGS. 1 and 3 shows a hopper 1 in which articles such as bottle preforms 2 are stored. This hopper 1 releases the preforms 2 by appropriate means which are not represented, such as those described in document EP 1690813 for example. The preforms 2 enter a conveying installation 3 which is arranged between said hopper 1 and a means for feeding said preforms 2 to a processing station, in particular a conditioning station 4 where these preforms 2 are heated before they are introduced into blow molds, not represented, to be transformed into bottles.

When in full operation, the blow molds are used at a constant rate which requires a regular and continuous supply of preforms 2.

To obtain a regular supply to the conditioning station 4, meaning under a constant feed pressure, the conveying installation 3 comprises several preform 2 conveyor systems.

As diagrammed in FIGS. 1 and 3, the conveying installation 3 allows transferring preforms 2 by two modes of transport: maintained in the vertical position (FIG. 1) or in the horizontal position (FIG. 3).

This conveying installation 3, in either of the two modes of transport illustrated in FIG. 1 or FIG. 3, comprises, in particular, a first conveyor 5 where the extraction of the preforms 2 occurs and comprises, after this first conveyor 5, a second conveyor 6 where the accumulation of the preforms 2 occurs.

The extraction conveyor 5 consists of two endless conveyor members 7 and it is responsible for feeding preforms 2 to the conveyor-accumulator 6 that follows. This conveyor-accumulator 6 also consists of two endless conveyor members 8 and it directly or indirectly feeds a conveyor device for these preforms 2 which is in the form of a star wheel 9, with said wheel 9 feeding preforms 2 to the conditioning station 4.

This star wheel 9 is fed by the conveyor-accumulator 6; said conveyor-accumulator may comprise two conveyors, one consisting of conveyor members 8 and the other of two conveyor members 8' as represented in FIG. 1, and as described in the document EP1559663 mentioned above, said second conveyor being synchronized with said star wheel 9 to control the preform feed pressure to this star wheel 9. However, it is equally possible for such synchronization to be done with the first conveyor consisting of conveyor members 7, if necessary.

A guide 10 may be placed between the star wheel 9 and the conveyor members 8 or 8', depending on the case. In the case in FIG. 1, for vertically conveyed preforms 2, this guide 10 simply establishes the connection between the end of the conveyor-accumulator 6 and the star wheel 9; in the case in FIG. 3, where the preforms 2 are conveyed horizontally, the guide 10' performs a supplemental adjustment function, as described in document FR 2930241, to change said preforms 2 from the horizontal position to the vertical position.

The star wheel 9 takes the preforms 2 as they exit the conveying installation 3 and presents them to the conveyor 11 of the conditioning station 4.

Figure 2:
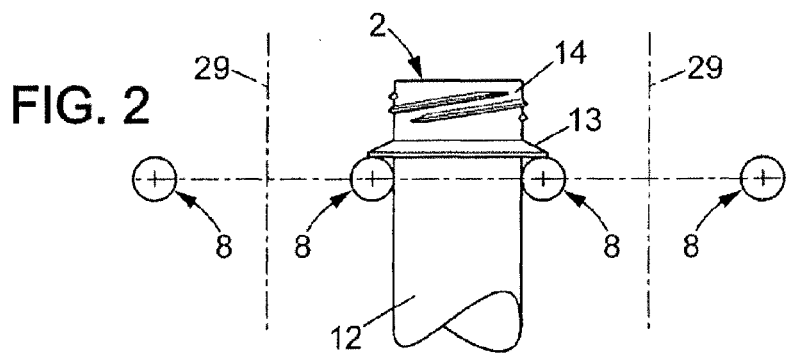
FIG. 2 is an enlarged cross-section of the active sides of the conveyor system along line II-II in FIG. 1, with a partially represented preform being conveyed in the vertical position between said active sides.

FIG. 2 shows a preform 2, partially represented, which is carried and conveyed by the active sides of the conveyor members 8, as described in document EP1559663 mentioned above.

In this example, represented in FIG. 2, the active sides of the conveyor members 8 grasp and press the cylindrical body 12 of the preform 2. The preform 2, when it is in the vertical position, rests on said active sides by the collar 13 separating its body 12 from its neck 14.

Figure 4:
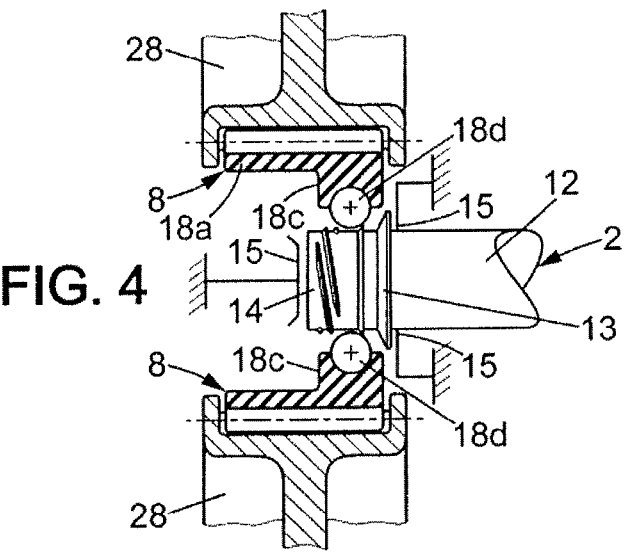
FIG. 4 is an enlarged view of the active sides and pulleys of the conveying system along line IV-IV of FIG. 3, with a partially represented preform being transported and conveyed in the horizontal position between said active sides.

In the embodiment in FIG. 4, the preforms 2 are being conveyed in the horizontal position and, in this case, the active sides of the conveyor members 8 press against the neck 14 of said preforms 2, said preforms 2 additionally being guided by several rails 15 which act as fixed guides; two rails 15 are arranged behind the collar 13, one on each side of the body 12 of the preform 2, and one rail 15 is placed in front of the end of the neck 14, meaning in front of the mouth.

The various conveyor members (7, 8, 8') of the installation 3 consist of belts. In the portion relating to the extraction conveyor 5, the conveyor members 7 consist of two endless belts 17 which are tensioned and driven by pulley sets 27. In the portion relating to the conveyor-accumulator 6, the conveyor members 8 consist of two belts 18 which are also tensioned and driven by pulley sets 28. The supplemental conveyor 6' if any also consists of two belts 18' which are tensioned by pulley sets 28'.

The contact relationship may differ depending on the function assigned to the conveyor on which the preforms 2 are placed during their transport.

For the conveyor-accumulator 6, where the contact relationship inevitably includes friction, the active portion of the belts 18 of the conveyor members 8 which is in direct contact with the preforms 2 consists of a natural material: leather.

Figure 5:
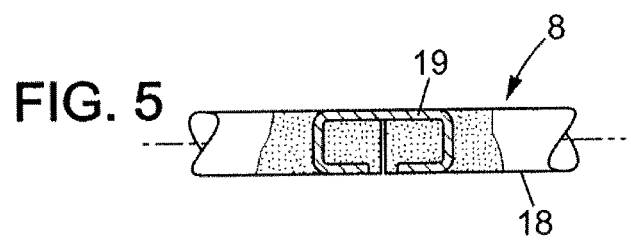
FIG. 5 represents, more or less to scale, a portion of a conveyor member in the form of a leather cord having a circular cross-section, showing the attachment joining the two ends of said cord.
Figure 6:
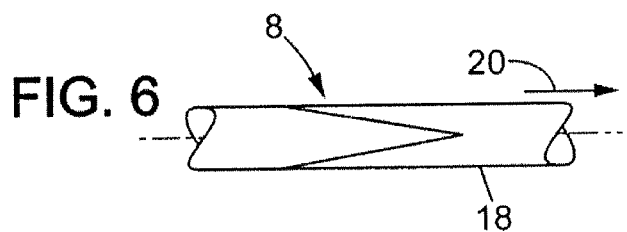
FIG. 6 represents a variant of the attachment of FIG. 5.
Figure 7:
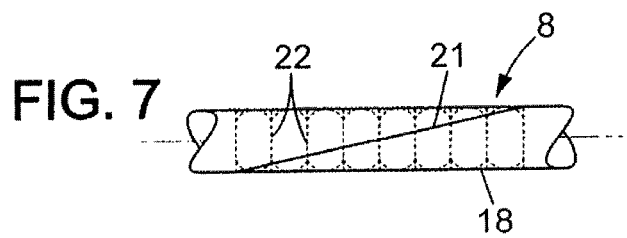
FIG. 7 represents another variant.
Figure 8:
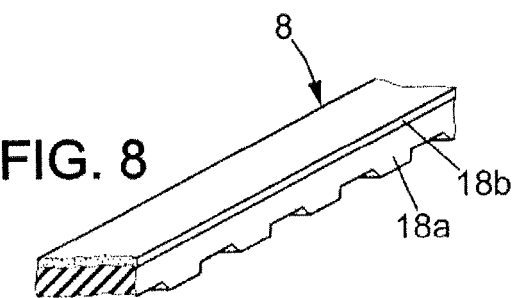
FIG. 8 is a perspective view of the conveyor member in the form of a combination, or composite type, flat belt.
Figure 9:
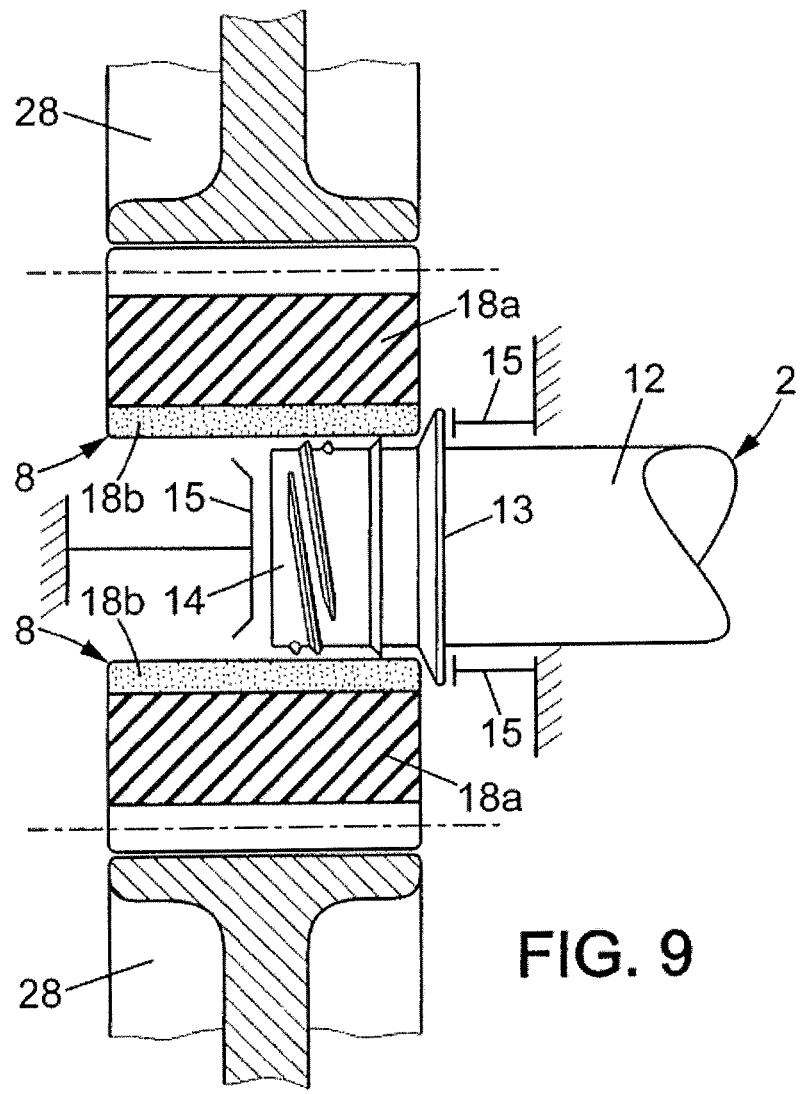
FIG. 9 is a view analogous to the one in FIG. 4, with a belt according to the embodiment in FIG. 8.

The endless belts 18 which constitute the conveyor members 8 of the conveyor-accumulator 6 may take different forms, as represented in FIGS. 4 to 9. They may be integrally made of leather, as represented in FIGS. 5, 6 and 7, or be a combination, or composite, as represented in FIGS. 4, 8 and 9.

A conveyor member 8, in the form of a monolithic belt 18 completely made of leather as represented in FIGS. 5 to 7, is in the form of a tanned leather cord, said cord being cut with the grain, the grain side being intended for contact with the preforms, and the cord has a cross-section which is circular or substantially circular. This cord can be joined together at its ends in various ways.

FIG. 5 shows the ends of the cord joined together by a staple 19 to form a belt 18. This staple 19 is arranged and embedded or housed in grooves to avoid contact with the preforms 2.

FIG. 6 shows a belt 18 where the ends of the cord are cut to form an axial V and are joined together by gluing. This configuration requires that the belt 18 operate in the direction represented by the arrow 20.

FIG. 7 shows an assembly of the ends of a belt 18 which is realized in the form of a scarf joint 21. This scarf joint 21 may be glued, or it may be realized by means of stitches 22.

To obtain an even more effective attachment of the ends of a belt 18, in the case of the examples represented in FIGS. 6 and 7, said ends of the cord may be joined by both gluing and stitches.

FIG. 8 represents a portion of a flat endless belt 18. This flat belt 18 is a combination, or composite, type of belt; it comprises a portion consisting of a first belt 18a, and a portion consisting of a strip 18b covering the back of said first belt 18a.

The first belt 18a is a conventional transmission belt, notched, for example with herringbone or curvilinear teeth, with self-centering effect, which is in contact with the guide and/or drive pulleys 28, while the second belt 18b is a strip formed of a leather covering intended to come into contact with the preforms 2 and in particular, as illustrated in FIG. 9, with the neck 14 of these preforms 2.

In the case of a conveyor member consisting of a pair of endless belts in which each belt is of the composite type, with a portion consisting of a plastic material that is food grade polyurethane and a portion of leather, the two portions may be assembled together by polymerization after the leather is impregnated on the flesh side with polyurethane, the grain side being intended to be placed in contact with the preforms.

FIG. 4 illustrates an example of using conveyor members 8 which are also of the combination, or composite, type.

Each conveyor member 8 comprises a notched belt 18a which cooperates with a pulley 28 such as a grooved pulley for example. In a variant embodiment, the belt 18a and the pulley 28 may have self-centering herringbone or curvilinear teeth. This belt 18a comprises, projecting from its back and part of the same piece, for example, a belt 18d which fits into a rib 18c comprising a groove that accepts the belt 18d integrally made of leather. This belt 18d is related to the belts detailed above in relation to FIGS. 5 to 7; it is in the form of a cord with a circular cross-section, which fits into a groove having a semi-circular cross-section in the rib 18c.

The belt 18d may be in sliding contact with the groove of the rib 18c or may be glued into this groove. It projects from the rib 18c to act as a contact surface for the preforms 2.

FIG. 9 illustrates an example of using conveyor members 8 which are flat combination or composite belts as illustrated in FIG. 8.

In this embodiment, the preforms 2 are conveyed horizontally and the active sides of the conveyor members 8 press against the neck 14 of the preforms 2. The preforms 2 are additionally guided by multiple rails 15 which act as fixed guides; two rails 15 are arranged behind the collar 13, one on each side of the body 12 of the preform 2, and one rail 15 is placed in front of the end of the neck 14, meaning in front of the mouth.

Each conveyor member 8 comprises a notched belt 18a, for example with self-centering herringbone or curvilinear teeth as illustrated in FIG. 9, which cooperates with a pulley 28 having teeth that mesh with it. On the back of this belt 18a is a strip 18b formed of a leather covering intended to come in contact with the preforms 2, and in particular with the neck 14 of these preforms 2, as illustrated in FIG. 9.

The contact relationship of the preforms 2 with the extraction conveyor 5 is different from the relationship which can exist with the conveyor-accumulator 6 and with the supplemental conveyor 6' if any.

In the case of the conveyor-extractor 5, this contact relationship does not generate any continuous friction so to speak; however, for uniformity reasons, it may be of interest to use leather belts for the first conveyor-extractor 5 and for the possible supplemental conveyor 6', particularly because for smaller belt lengths, these belts can be directly fashioned into endless form.

In one variant embodiment of the invention, the conveyor members 8 may also consist of conveyor chains, as stated in document EP 1559663 mentioned above; in this case leather may also be used to cover only the active surface of the chain, meaning the surface which is in direct contact with the preforms 2.

Although the description of the embodiments illustrated by FIGS. 2 and 4 to 9 has primarily been made relative to the conveyor members 8 of the conveyor-accumulator 6, the conveyor members 7 and 8' associated with the conveyor-extractor 5, and the possible supplemental conveyor 6' can have similar characteristics without leaving the scope of the invention.

Similarly, the invention described for the transport of preforms is completely transposable to the field of conveyance for bottles as well as for products of thermoplastic materials such as PET etc.

The invention claimed is:

1. An installation for conveying articles of a thermoplastic material, comprising:
   at least one conveyor including two conveyor members having active sides that are parallel to each other and configured to receive and transport said articles arranged in single file between said active sides,
   wherein each conveyor member has an active portion comprising a surface including leather material, which is configured to be in direct contact with said articles,
   wherein the active portion comprises a notched flat belt and the surface including the leather material is formed a surface of the notched flat belt,
   wherein at least one of the conveyor members comprises a combination belt comprising a portion comprising a conventional transmission belt and a portion comprising a strip comprising a leather covering for the contact with the transported articles,
   wherein the transmission belt has a projecting rib with a groove, which is formed on a back of the transmission belt, and a belt made of leather is disposed in the groove and is configured to directly contact said articles.

2. The installation for conveying articles of a thermoplastic material, according to claim 1, wherein the belt has a substantially circular cross-section with a diameter of about 9 mm.

3. A method of conveying thermoplastic preform bottles, comprising:
   receiving and transporting said preform bottles, using a conveyor member having a pair of active sides that are parallel to each other, so that the preform bottles are in single file between said active sides,
   wherein the active sides each comprise a surface including leather material in direct contact with a neck of the preform bottles during transporting.

4. The method of conveying thermoplastic preform bottles according to claim 3, wherein the surface including the leather material is a leather belt, and the active sides comprise an endless belt having a rib projecting from a rear side of the endless belt along a longitudinal direction thereof, and a groove formed in the rib along a longitudinal direction thereof which holds the leather belt therein for directly contacting the neck of the preform bottles during transporting.

5. The method of conveying thermoplastic preform bottles according to claim 4, wherein the belt has a substantially circular cross-section with a diameter of about 9 mm.

6. The method of conveying thermoplastic preform bottles according to claim 3, wherein the surface including the leather material is a leather strip, and the active sides comprise an endless notched belt and the leather strip is disposed on the endless notched belt for directly contacting the neck of the preform bottles during transporting.

7. The method of conveying thermoplastic preform bottles according to claim 3, wherein the active portion comprises an endless belt and the surface including the leather material is formed on the endless belt.

8. The method of conveying thermoplastic preform bottles according to claim 3, wherein the conveyor members comprise belts integrally made of leather.

9. The method of conveying thermoplastic preform bottles according to claim 8, wherein the belts have a substantially circular cross-section configured to directly contact the preform bottles during transport.

10. The method of conveying thermoplastic preform bottles according to claim 9, wherein the substantially circular cross-section has a diameter of about 9 mm.

11. The method of conveying thermoplastic preform bottles according to claim 9, wherein the belts comprise a leather cord having ends joined together by at least one staple, said staple being housed in grooves arranged in the leather.

12. The method of conveying thermoplastic preform bottles according to claim 9, wherein the belts comprise a leather cord having ends assembled in a scarf or V-shaped joint, with gluing.

13. The method of conveying thermoplastic preform bottles according to claim 12, wherein the scarf or V-shaped joint is assembled by stitches and glue.

14. The method of conveying thermoplastic preform bottles according to claim 3, wherein the active portion comprises a notched flat belt and the surface including the leather material is formed a surface of the notched flat belt.

15. The method of conveying thermoplastic preform bottles according to claim 3, further comprising several conveyors in which the conveyor members comprise, at least for the portion in contact with the transported preform bottles, leather belts.

16. A leather belt constituting the conveyor member in the method according to claim 3, for transporting the thermoplastic preform bottles between: an extraction device, which is associated with a station for storing said preform bottles for which a throughput can be adapted to the demand of a conditioning station for said preform bottles, and a feed device associated with the conditioning station for said preform bottles for which a throughput is constant when operating at normal speed.

17. A combination, or composite, belt, comprising a leather covering, said belt constituting the conveyor member in the method according to claim 3, for transporting, in contact with the leather, the thermoplastic preform bottles between: an extraction device which is associated with a station for storing said preform bottles for which a throughput can be adapted to the demand of a conditioning station for said preform bottles, and a feed device associated with the conditioning station for said preform bottles for which a throughput is constant when operating at normal speed.

* * * * *